(No Model.)  3 Sheets—Sheet 1.

G. H. HOLGATE.
REFRIGERATING MACHINE.

No. 451,393.  Patented Apr. 28, 1891.

Witnesses:

Inventor
Geo. H. Holgate,
by Albert A. Wood
Attorney.

(No Model.) 3 Sheets—Sheet 3.
G. H. HOLGATE.
REFRIGERATING MACHINE.
No. 451,393. Patented Apr. 28, 1891.

WITNESSES:

INVENTOR
Geo. H. Holgate,
BY
Albert A. Wood
ATTORNEY.

UNITED STATES PATENT OFFICE.

GEORGE H. HOLGATE, OF ATLANTA, GEORGIA.

REFRIGERATING-MACHINE.

SPECIFICATION forming part of Letters Patent No. 451,393, dated April 28, 1891.

Application filed February 4, 1890. Serial No. 339,212. (No model.)

*To all whom it may concern:*

Be it known that I, GEORGE H. HOLGATE, a citizen of the United States, and a resident of Atlanta, in the county of Fulton and State of Georgia, have invented certain new and useful Improvements in Ice-Machines; and I do hereby declare the following to be a full, clear, and exact description of the invention, such as will enable others skilled in the art to which it appertains to make and use the same, reference being had to the accompanying drawings, and to letters or figures of reference marked thereon, which form part of this specification.

This invention has reference to improved construction of apparatus commonly known as "ice-machines," relating more particularly to that class of such machines as are used to carry out what is known as the "absorption process" of refrigeration, the invention consisting of so improving the absorber and still as to render each more effectual and more easily and satisfactorily operable, the details of all of which will be hereinafter described, and the elements claimed as new pointed out in the claims.

Figure 1:
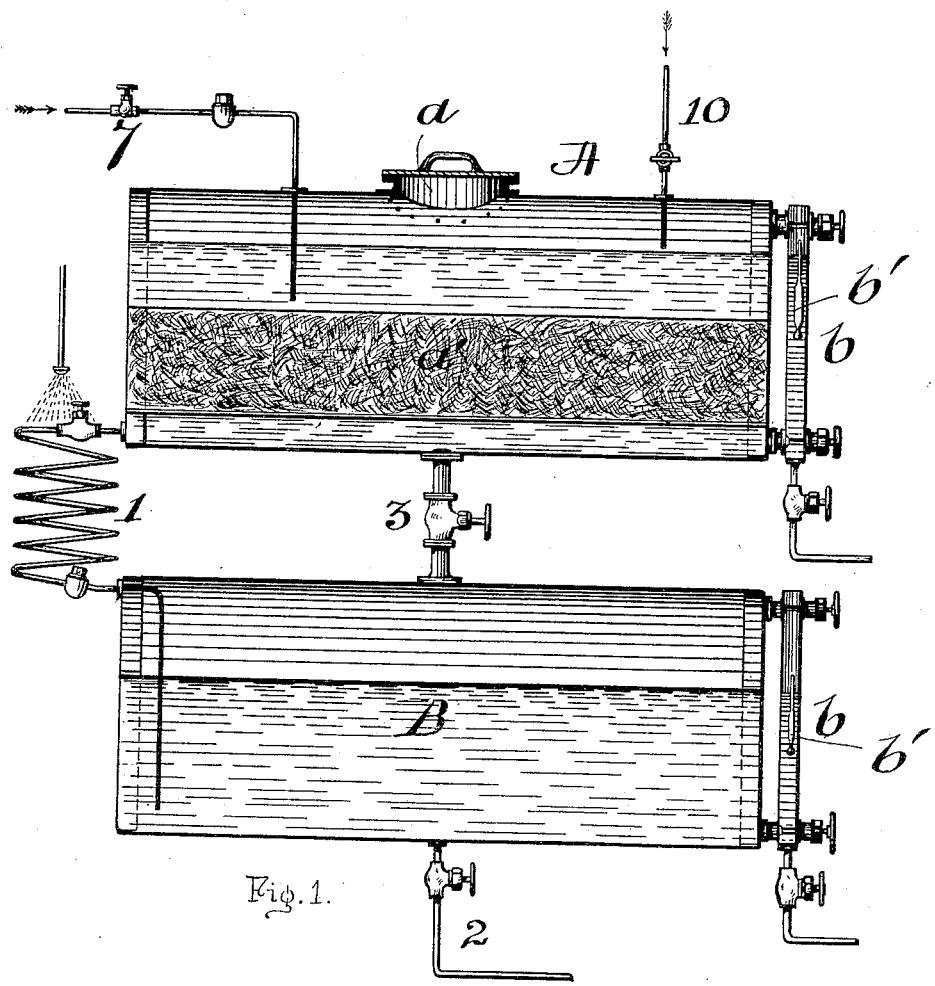
Figure 2:
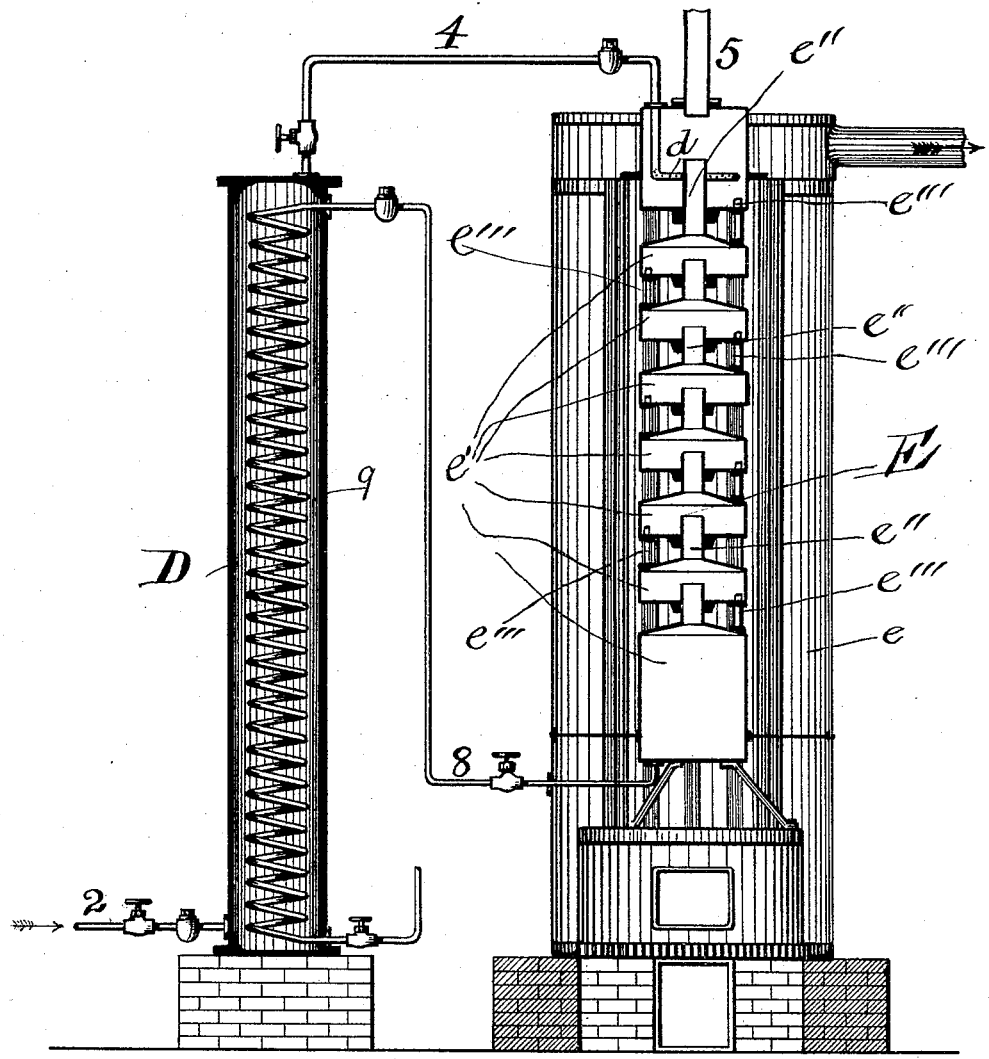
Figure 3:
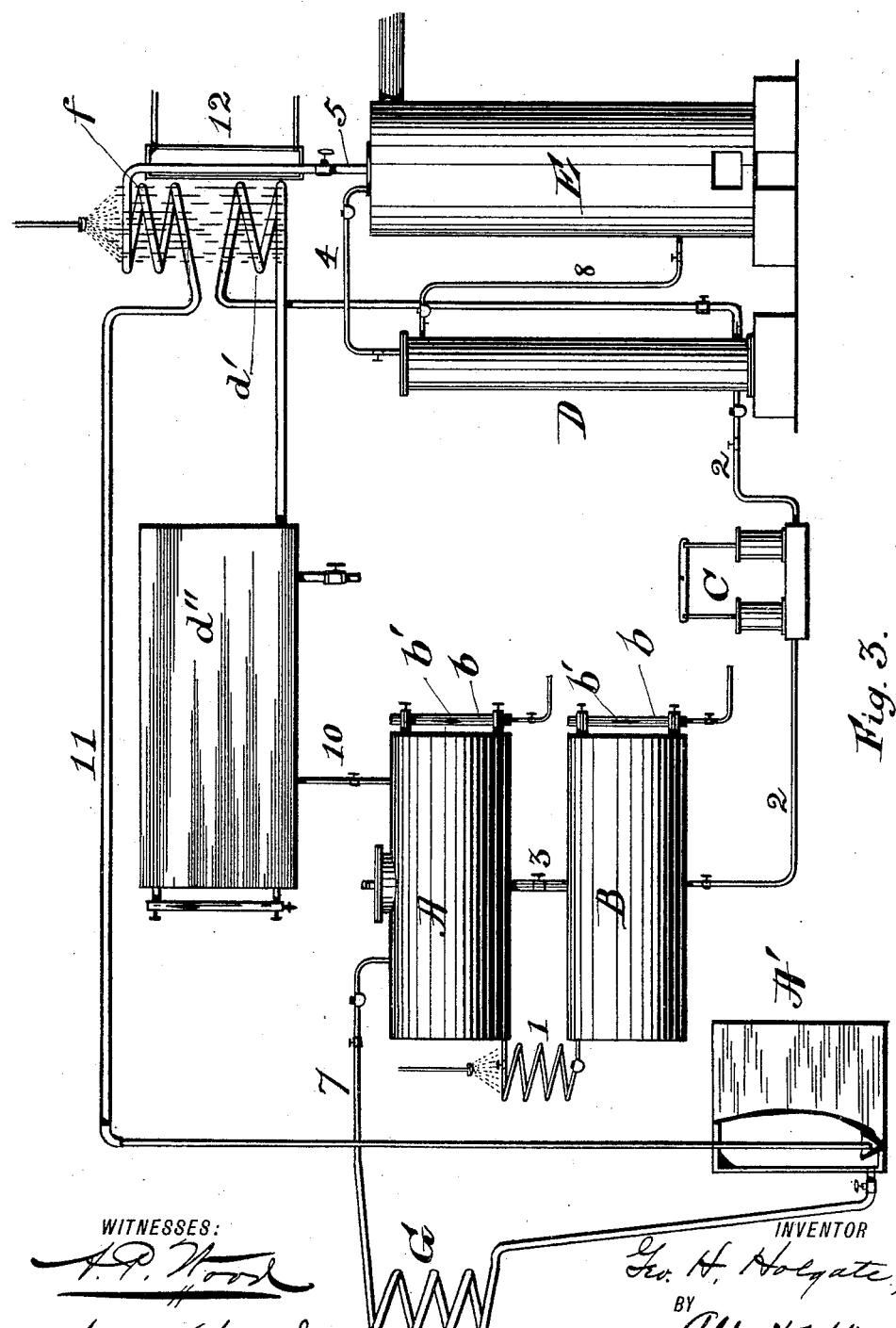

In the accompanying drawings, Figure 1 is a central vertical section through the absorber, showing the same complete in all its details. Fig. 2 is a central vertical sectional view of the still and at the left the device for cooling the weak water from the still and heating the strong water passing thereto. Fig. 3 is a side elevation of the device assembled, showing, in addition to the elements illustrated in the hereinbefore-named figures, a congealer and an ammonia-liquefier, both of which, together with the pumps therein shown, are shown in rudimentary form, as it is immaterial what efficient devices are used for the functions required of these parts.

In the figures like reference-marks indicate corresponding parts in the several views.

A is the absorber, which is also a filter in operation and is intended to eliminate the ammoniacal glue and other foreign substances from the strong water. The absorber in the specific construction shown is made of circular form of sheet metal of the desired strength, and has a man-hole $a$ for access to the interior, and has placed on a suitable substructure at a distance from the bottom of the absorber the filter $a'$, of material of suitable character, to cleanse the aqua-ammonia by filtration of any foreign substances it may contain in the shape of solids. The pipe 7 enters at the top of the absorber and connects at its other end with the coils of the congealer, being used in the operation for the purpose of conveying the ammonia-gas to the weak water in the absorber, which is continually entering through the pipe 10 from the receiver A', which connects by pipe 11 with the still. Interposed between the absorber A and the reservoir B is a coil 1, which is either immersed in water or sprayed therewith for the purpose of cooling the strong water after its passage through the filter and before its passage into storage for use in the still, thereby eliminating the chemical and sensible heat from the liquid. The storage-tank or reservoir B is of any desired form and of the necessary capacity, and is also connected with the absorber A by the pipe 3 in case it is desired to quickly empty the absorber without passing the aqua-ammonia through the necessarily-restricted passage through the cooling-coil, the pipe 3 being normally closed by a valve. The reservoir B has connected with a suitable point therein the pipe 2, which, as shown in Fig. 3, runs to a pump C, which forces the strong water through the heater to the still, both of which will be hereinafter fully described. To facilitate the operation of testing the specific gravity of the aqua-ammonia, which is now performed in a comparatively crude manner, glass gages $b$ are set in the ordinary manner to the ends or sides of the absorber and the reservoir B, either or both, and have connection both at their top and bottom ends with the receiver, to which each gage is attached, having suitable valves for cutting off the communication through said connections and a suitable drain-cock in the bottom of the tube-setting. In the interior chamber of these two tubes and adapted to float freely in the contents which may be at times contained therein are the hydrometers $b'$, of the character suitable for the purpose. It is obvious that by reason of this construction the specific gravity, and thus the degree of absorption, can be ascertained at any time without necessitating the removal of any part of the aqua-ammonia from its receiver, and that an accurate test can at all times be had of the aqua-ammonia actually in operation without exposure to the air of the material actually under test.

As hereinbefore mentioned, the pipe 2, Fig. 3, leads from the reservoir B and indirectly through said reservoir from the absorber to the heating-receiver D, a force-pump being interposed for the purpose of lifting the strong aqua-ammonia through the cylinder D and by means of the pipe 4 to the nozzle $d$, which sprays it into the still-pans, (shown in Fig. 2,) the heated weak aqua-ammonia being carried from the lowermost pan through the pipe 8 to the coil 9, radiating its heat during its passage through said coil into the strong aqua-ammonia, passing upwardly through the cylinder D around the said coil, and forced to the cooling-coil $d'$ and into the weak-ammonia-water tank $d''$, and from there to the absorber, there to absorb the anhydrous ammonia entering through the pipe 7 from the congealer G. The cylinder D and coil 9, respectively, may be of any form requisite to the functions required; but the specific form shown is thought to be the best, inasmuch as it provides a great radiating-surface, and takes up a very little floor-space, and can be set in very close proximity to the still, and may be set on a foundation of brick-work of small horizontal section.

At the right in Figs. 2 and 3 is shown the still E, which is constructed of an upright steam-generator $e$, having the fire-box, as usual, and tubes extending vertically therein, leaving, however, a space between them in the center of the boiler for the still, which will be immersed partly in water and partly in steam at approximately the same degree of temperature, which is sufficient degree to drive the ammonia-gas from the strong water under about ten atmospheres pressure, this temperature being kept up by the fire under the boiler.

As shown in the accompanying drawings, the fire-box is a drum within the outer shell of the boiler, and on the top of this drum is superimposed the proper still, which, if desired, may be supported on legs, as shown; but in any case there should be room for the circulation of water under its bottom, and it has in the construction shown stay-bolts extending to the shell of the boiler, which hold it in an upright position. The still proper is composed of a series of pans $e'$, air-tight as to any exterior outlet and having connection one with the one above in series for the passage of gas by pipes $e''$, which pass out of the apex of the conical top of the lower pan $e'$ through the flat bottom of the next above in the series, while the passage downwardly of the strong water from which the gas is being distilled is had through pipes $e'''$, which connect the pans near their sides, projecting up for, say, an inch above the bottom of each pan for the purpose of allowing a small quantity of the strong water to remain in each pan from which the gas is driven, and which is constantly kept agitated by the evolution of gas and the constant addition of fresh material through the pipes $e'''$, thus insuring the best possible results and the greatest possible gravity of the weak water passing to the absorber. The lower one of the pans $e'$ is larger than the others for the purpose of acting as a reservoir in case the outlet of weak water should be stopped temporarily for some purpose, in which case the vaporization would continue through the stoppage of said efflux without detriment. The upper pan forms a chamber for the spraying-nozzle $d$, which is, as before stated, the place of entrance of the strong water from the absorber, and it also is connected with the liquefier by the pipe 5, which passes through an anhydrator 12. Each pan in this form of still is preferably made separate and screwed together with suitable packed joints, both as to the gas-pipes $e''$ and the pipes $e'''$ and the exterior connections. It is obvious that very great heating-surface is obtained by this construction and arrangement, and that a greater perfection of operation will result therefrom. From this still the gas passes under pressure sufficiently high — that is, about ten atmospheres — through the coil $f$ of a liquefier sprayed by a cooling agent, where the gas is liquefied and flows under pressure to the receiver A, and from there it may be drawn into a receiver or carried in pipes to the expansion-point in the congealer, where it performs its function of absorbing the heat from the article to be refrigerated and passes from the expansion-chamber of the congealer through the pipe 7 to the absorber, where it is returned to strong water and again distilled and used.

No improvement is claimed for the congealer or the liquefier F, nor the construction of the pump C and the tanks $d''$ and A', and hence these devices may be of any form suitable for the work required of them, and I do not confine myself to the employment of any particular form of these elements.

Having thus described my invention, what I claim as new, and desire to secure by Letters Patent of the United States, is—

1. In a refrigerating device of the described class, the combination of the absorber A, provided with a filter, the reservoir B, communicating with said absorber through the coil 1, the heating-receiver D, connected with the reservoir B, the intermediate force-pump C, the coil 9 within said receiver D, the still connected at one end with the coil 9 and at the other with the receiver, and the tanks $d''$ and A', connected with the receiver and the still E, respectively, and connected with the absorber, substantially as and for the purpose specified.

2. In a refrigerating device of the described class, a still consisting of the pans $e'$, having conical tops and arranged one above the other, the pipes $e''$ and $e'''$, connected with a lower pan and extending a short distance into the pan immediately above, the pipe $e'''$ not extending so far into the upper pan as the pipe $e''$, the upper of said pans having an outlet-pipe 5 and an inlet-pipe 4, provided with a spraying-nozzle $d$, and the lower of said pans having the outlet-pipe 8, and the heating-tubes surrounding said pans, substantially as shown and described.

In testimony whereof I hereunto affix my signature in presence of two witnesses.

GEO. H. HOLGATE.

Witnesses:
    A. P. WOOD,
    J. J. SULLIVAN.